United States Patent [19]

Kurple

[11] Patent Number: 4,851,457

[45] Date of Patent: Jul. 25, 1989

[54] FOUNDRY RESINS

[76] Inventor: Kenneth R. Kurple, 9533 Springborn Rd., Anchorville, Mich. 48004

[21] Appl. No.: 157,319

[22] Filed: Feb. 16, 1988

[51] Int. Cl.[4] .............................................. B22C 1/20
[52] U.S. Cl. .................................. 523/142; 524/590; 524/875
[58] Field of Search ....................... 523/142; 524/590; 530/505

[56] References Cited

U.S. PATENT DOCUMENTS

| | | | |
|---|---|---|---|
| 3,072,634 | 1/1963 | Santelli et al. | 530/505 |
| 3,577,358 | 5/1971 | Santelli et al. | 530/505 |
| 3,862,080 | 1/1975 | Standen et al. | 523/142 |
| 3,933,727 | 1/1976 | Schmid | 523/142 |
| 4,293,480 | 10/1981 | Martin et al. | 523/142 |

*Primary Examiner*—Lewis T. Jacobs
*Attorney, Agent, or Firm*—Woodling, Krost and Rust

[57] ABSTRACT

A process for making sand cores or molds is disclosed; the completed cores and molds as well as a binder for holding the sand particles together. The resin binder is used in the process and in the finished product comprising lignin dissolved in a suitable solvent reacted on or cured with an isocyanate material. Curing can be accomplished by the use of an amine along with a catalyst if desired. A polyether polyol may be integrated with the lignin to vary the physical characteristics of the binder.

16 Claims, No Drawings

FOUNDRY RESINS

At the present time, the foundry industry uses a resin system that is mixed with foundry sand to produce cores and molds which provide the form for molten metal. The purpose of resin is to hold the sand particles together so that the molten metal will surround the core or mold and as the molten metal cools and solidifies, the molten metal acquires a shape that is determined by the core and mold. In the case of a core, the resin or cured resin product has to hold the sand particles together long enough for the molten metal to set and then the resin or cured resin product has to be able to break down so that the solid core becomes loose sand. This is very important, as for example in the case of an exhaust manifold for a vehicle, the core has to break down into loose sand so that the loose sand can be removed by simply shaking the exhaust manifold. If the core remains solid, it requires a considerable amount of time and labor to remove a solid core. This additional cost would make the mass production of these parts impossible because they would be very unprofitable to produce.

Also, if any of the sand core remained solid and was not removed, when the finished casting was assembled into its particular use the presence of the solid sand core could cause serious problems in the function of the final assembly.

Depending on its use, the presence of a solid sand core could block the circulation of cooling water in an engine and thereby cause it to overheat and possibly ruin the entire engine. Also, if the solid sand core started to break down after the part was assembled, it could release sand into a precision engine and could ruin the engine.

At the present time, the majority of foundry resins are based on phenol formaldehyde resins. These resins have several major drawbacks. One is the presence of unreacted phenol which is very corrosive to unprotected human tissue. This can cause problems with workers who come into contact with these resins. Perhaps the most serious drawback of these phenol-formaldehyde resins is the presence of free formaldehyde.

When these resins are used, the formaldehyde vapor is very noticeable and also very irritating to eyes and the respiratory tract. It is a well known fact that exposure to formaldehyde is a serious health risk. In fact, OSHA has recently lowered the permissible exposure level of formaldehyde to less than 1 part per million. This is because of the severe health problems associated with formaldehyde. In order to meet these requirements, foundries have to make significant capital investments to remove formaldehyde fumes or use more expensive resins which do not contain formaldehyde.

However, phenol formaldehyde resins are generally the least expensive resins to use and by using other resins, foundry costs would increase. The use of such resins is disclosed in U.S. Pat. No. 3,409,579.

The present invention deals with a material that can be readily used for foundry resins in both cores and molds. This material also contains no formaldehyde and is therefore safer to use. This material is lignin, or preferably kraft lignin, from the soda or sulfide process.

One of the most important properties of lignin is that it contains hydroxyl functionality. In this way, the lignin molecule can undergo chemical reactions with isocyanates. One chemical reaction which is very important is the reaction of a hydroxyl group with an isocyanate group to produce a urethane group.

The present invention uses kraft lignin instead of a phenol formaldehyde resin and therefore has no formaldehyde problem and is therefore safer to use.

This new invention allows the total replacement of the phenol formaldehyde resin which makes the system more economical to use. In addition to the use of lignin, it reduces the amount of isocyanate that is needed to produce a cured resin. The present isocyanate-phenol formaldehyde technology uses almost one part phenol formaldehyde resin to one part isocyanate in order to produce a cured resin. The present invention allows the isocyanate to be reduced by as much as fifty per cent and still produces a cured resin.

The fact that this new invention has no formaldehyde present and also reduces the amount of isocyanate needed to produce a cured resin are major advantages.

The fact that the isocyanate can be reduced by as much as 50% also means that there could be a significant reduction in pinholes in the castings since it is generally believed that the pinholes in castings are associated with the amount of nitrogen present in the binder. The only source of nitrogen in the binder is from the isocyanate or polyisocyanate. This is a major advantage to improve the quality and productivity of the castings.

The present invention contemplates the process of making foundry molds and cores; the resulting mold and/or core as well as the binder for accomplishing the desired molds and cores. Conventional foundry molding can be used in the invention and the lignin may be sulfate kraft lignin, soda kraft lignin, lignin from a solvent pulping process or lignin derived from a biomass process. As a matter of example the usable lignin may be as derived in U.S. Pat. No. 4,111,928. The solvents usable herein may also be those as disclosed in the referred to patent; however, a mixture of aliphatic dimethyl esters manufactured by Dupont and known as DBE are particularly useful. Other useful solvents are propylene glycol mono methyl ester acetate, methyl amyl ketone diacetone alcohol and cellosolve acetate. In general the lignin is dissolved to about 50% by weight in the solvent; however, this may be varied within reasonable limits depending to some degree on the solvent and the molecular weight of the lignin being used. It is preferred in the process of making the cores and molds that the sand particles be intimately mixed with the lignin-solvent mixture before any materials be added which would promote curing or polymerization.

The isocyanate component of the system—sometimes referred to as the hardener component—is not necessarily but is preferably a liquid polyisocyanate containing at least two isocyanate groups or an isocyanate terminated prepolymer containing at least two isocyanate groups. An aromatic polyisocyanate such as diphenylmethane diisocyanate is a suitable material. This component is preferably added after the lignin-solvent has been mixed with the sand.

The curing agent used is preferably a tertiary amine preferably carried in an inert gas. The action of the amine is catalytic in nature and very small amounts are needed. Suitable tertiary amines are trimethyl amine and triethyl amine.

It is possible to alter to some degree the physical characteristics of the resin system by adding a polyol. Polyether polyols are used and are those materials prepared by reacting propylene oxide or ethylene oxide with many starting materials such as for example glycerin, trimethylolpropane and amino alcohols. Polyester polyols may also be used within the present teachings.

A suitable tin catalyst for use in the invention is dibutyl tin dilaurate.

In general in practicing the invention it is preferred to use about ¼% to 10% resin system based upon the weight of sand to be treated. An optimum amount would be on the order of 1% to 2%. The amount of lignin used in relation to the isocyanate material is a function of the molecular weight of the lignin. Generally the higher the molecular weight of the lignin the less isocyanate is used. Generally 1 part lignin is used with 1 part isocyanate and one might use 2 parts lignin to 1 part isocyanate. When a polyol is used, the amount used in relation to isocyanate is considered as part of the lignin. The small amount of amine used is about 0.91% to 5% of the inert gas stream and the amount of tin used is very small, i.e. 0.1% (0.001) of the resin system.

Another major advantage of this present invention is that it is not necessary to use a tertiary amine in an inert gas to catalyze the reaction. There are commercially available catalysts that can be used instead of a tertiary amine in an inert gas. This is a major advantage because it allows this lignin resin system to be used for parts where it is not desired to have a tertiary amine in an inert gas pass through the core or sand mold. This would apply to sand cores or molds which are too large or those sand cores or molds which would not be economical to use a tertiary amine in an inert gas for catalyzing the reactions.

Another major advantage of this present invention is that isocyanate terminated prepolymers can be used instead of aromatic polyisocyanates or diisocyanates or in combination with polyisocyanates or diisocyanates. These isocyanate terminated prepolymers can be made by reacting diisocyanates with polyether diols of various molecular weights or polyester diols of various molecular weights. This approach provides a very effective and efficient way of modifying the physical properties of the core or sand mold to obtain the desired physical properties. Because it is more economical in some cases to modify the isocyanate terminated prepolymer than it is to change the lignin molecule that it is reacted with.

In addition, there is a wide variety of isocyanate terminated prepolymers can be used at 100% solids or they can be dissolved in appropriate solvents that provide the optimum handling and physical properties of the cured core or sand mold.

The following are examples of the teachings of the present invention and how to make and use the same:

EXAMPLE 1

Into a standard laboratory foundry muller which has a capacity for mixing at least 100 pounds of sand, 100 pounds of foundry sand was charged and allowed to mix while 1 pound of a 50% lignin solution in DBE (dimethyl glutarate, dimethyl adipate, dimethyl succinate—Dupont-mixed aliphatic dimethyl esters) was added to the sand and allowed to mix for 2 minutes and then 0.4 pounds of Papi 27 (polymethylene polyphenyl isocyanate) was added to this mixture and allowed to mix for one minute. This foundry mix was molded into a core and then inert gas which contained a tertiary amine was passed through the core which rapidly cured the core so that it had sufficient green strength so that it could be removed from the mold. This cured mold was then placed in a sand core box and molten cast iron was poured into the mold. The molten iron surrounded the core and when sufficiently cooled, the cast iron part was removed from the mold. This core not only produced a good part, but the heat from the molten metal was sufficient to break the resin down so that after the metal set, the core became loose and sand was easily removed from the inside of the casting. This showed that the lignin molecule when properly cured with a polyisocyanate produces a core which has not only sufficient green strength, but also is strong enough to withstand the heat from the molten metal until the molten metal sets. In addition, the lignin molecule readily broke down and enabled the sand to be easily removed from the casting.

The same example was again repeated with the exception that the lignin was replaced with kraft soda lignin.

The same example was again repeated as set forth initially except that Papi 27 was replaced with a 70% solution of Mondur PF, a commercial isocyanate terminated prepolymer, in propylene glycol monomethyl ether acetate.

The same example was gain repeated as set forth initially except that the 0.4 pounds of Papi 27 was replaced with a 70% solution in propylene glycol monomethyl ether acetate of 0.25 pounds of Papi 27, an aromatic polyisocyanate, and 0.25 pounds of Mondur PF, an isocyanate terminated prepolymer.

The same example was again repeated as set forth initially except that the 1 pound of 50% lignin solution in DBE was changed to 1 pound of 50% lignin solution dissolved in propylene carbonate.

The same example was again repeated as set forth initially except that the 1 pound of lignin was replaced by 1.0 pound of a mixture of lignin which consisted of 0.3 pounds of lignin, 0.1 pound of TP-440, a polyether polyol, and 0.1 pounds of Pluracol 1010, a polyether polyol and 0.5 pounds of propylene carbonate, a solvent.

In these additional examples, the cores produced were as satisfactory as those produced in the initial example.

EXAMPLE 2

This example shows that the kraft lignin can be mixed with a polyether polyol such as TP-440 or a combination of polyether polyols from BASF so that a wide variety of physical properties can be obtained. Into a standard laboratory foundry muller which has the capacity for mixing at least 100 pounds of foundry sand, 100 pounds of foundry sand was charged and allowed to mix while 1 pound of a lignin polyether polyol blend was added to the sand. The lignin polyether polyol blend consisted of 1 part kraft lignin and 1 part TP-440 polyether polyol (reaction product of propylene oxide and trimethylol propane with a hydroxyl number of 398) and 2 parts DBE solvent (dimethyl glutarate, dimethyl adipate, dimethyl succinate—Dupont-mixed aliphatic dimethyl esters) . This mixture was allowed to mix for 2 minutes than 0.4 pounds of Papi-27, polymethylene polyphenyl isocyanate, was added to this mixture and allowed to mix for one minute. This foundry mix was molded into a core and then an inert gas which contained a tertiary amine was passed through the core which rapidly cured the core so that it had sufficient green strength so that it could be removed from the mold. This cured core was then placed in a sand core box and molten cast iron was poured into the mold. The molten cast iron surrounded the core and when sufficiently cooled, the cast iron part was removed from the sand mold. This core produced a good part, and the sand was easily removed from the sand mold.

The same example was again repeated with the exception that the lignin was replaced with kraft soda lignin.

The same example was again repeated as set forth initially except that the 0.5 pounds of Papi 27 was replaced with 0.8 pounds of a 70% solution of Mondur PF, a commercially available isocyanate terminated prepolymer, in propylene glycol monomethyl ether acetate.

In these additional examples, the cores produced were as satisfactory as those produced in the initial example.

EXAMPLE 3

This example illustrates the use of a tin catalyst to increase the rate of cure. It is a well known fact that a combination of tin and amine catalysts produce a synergistic effect on the rate of cure. Therefore, it is possible to reduce the amount of time which the core has to be exposed to the amine in an inert gas (i.e. nitrogen) stream which will therefore improve productivity. Into a standard laboratory foundry muller which has the capacity for mixing at least 100 pounds of foundry sand, a 100 pounds of foundry sand was charged and allowed to mix while 1 pound of 50% lignin solution in DBE (dimethyl glutarate, dimethyl adipate, dimethyl succinate—Dupont-mixed aliphatic dimethyl esters) which contained 0.45 gms of T-9 (dibutyl tin dilaurate) catalyst which was added to the sand and allowed to mix for 2 minutes. Then 0.4 pounds of Papi-27, the aromatic isocyanate, was added to this mixture and allowed to mix for one minute.

This foundry mixture was molded into a core and then an inert gas which contained a tertiary amine was passed through the core which rapidly cured the resin in the core so that it had sufficient green strength so that it could be removed from the mold. The presence of a tin catalyst reduced the time that the core was exposed to the amine gas by at least 40%. This cured core was then placed in the appropriate outer sand mold and molten cast iron was placed into the mold. The molten cast iron then surrounded the core and when sufficiently cooled, the cast iron part was removed from the sand mold. This core produced a good part and the sand was easily removed from the inside of the part.

The same example was again repeated with the exception that the lignin was replaced with kraft soda lignin.

The same example was again repeated as set forth initially except that the 0.5 pounds of Papi 27 was replaced with 0.8 pounds of 70% solution of Mondur PF, a commercially available isocyanate terminated prepolymer in propylene glycol monomethyl ether acetate.

In these additional examples the cores produced were as satisfactory as those produced in the initial example.

EXAMPLE 4

The amount of sad and resin used to produce cores represents a large volume of material. However, these represent a fraction of the material that is used to produce the sand mold which surrounds the core. This outer mold is not cured by using an amine gas in an inert gas stream. It is cured by adding a catalyst or combinations of catalysts to the sand resin isocyanate mixture. Once this mixture is completely mixed, it starts curing immediately and usually within several minutes it has cured to the extent that it has sufficient green strength so that the sand mold can be removed from its cope and drag which are usually wooden molds designed to give the sand its desired form.

Into a standard laboratory foundry muller which has the capacity for mixing at least 100 pounds of foundry sand, 100 pounds of foundry sand was charged and allowed to mix while 1 pound of a 50% lignin solution in DBE (dimethyl glutarate, dimethyl adipate, dimethyl succinate—Dupont-mixed aliphatic dimethyl esters) was added to the sand and allowed to mix for 2 minutes. Then 0.4 pounds of Papi-27, the aromatic polyisocyanate, was added to this mixture and allowed to mix for 1 minute. Then 0.01 pound of an amine catalyst, namely phenol propylpyridine was added to the mixture and mixed for only 20 seconds. This foundry mix was molded into a core and also outer sand mold and within a few minutes the core had developed a sufficient green strength so that it could be removed from the mold. The outer sand mold was sufficiently cured in order to be removed from its mold. This cured core and outer sand mold were put together and then molten cast iron was poured into the mold. The molten cast iron surrounded the core and when sufficiently cooled, the cast iron part was removed from the mold. The part that was removed was a good part which showed that the core and outer sand mold performed well thereby showing that lignin functions as a binder for both the core and outer sand mold.

The same example was again repeated with the exception that the lignin was replaced with kraft soda lignin.

The same example was again repeated as set forth initially except that the 0.5 pounds of Papi 27 was replaced with 0.8 pounds of 70% solution Mondur PF, a commercially available isocyanate terminated prepolymer in propylene glycol monomethyl ether acetate.

It will be apparent to those skilled in the art that it is possible to dissolve or suspend the lignin in the polyol rather than a solvent under appropriate conditions.

In these additional examples the cores produced were as satisfactory as those produced in the initial example.

The invention has been described in detail with particular emphasis on the preferred embodiments thereof, but it should be understood that variations and modifications within the spirit and scope of the invention may occur to those skilled in the art to which the invention pertains.

What is claimed is:

1. The process of making a sand core or mold comprising the steps of mixing sand with lignin which has been dissolved in a suitable solvent material along with an isocyanate, forming said mixture into a core or mold and allowing said mixture to cure, said lignin and isocyanate being present in an amount in the range of ¼% to 10% by weight of the sand.

2. The process of claim 1 wherein the weight ratio of lignin to isocyanate is on the order 1:1 to 2:1.

3. The process of claim 2 wherein said core or mold is subjected to a gas containing an amine to assist the cure.

4. The process of claim 3 wherein a tin catalyst is added to the mixture.

5. The process of claim 1 wherein a polyol is added to the mixture.

6. The process of claim 3 wherein a polyol is added to the mixture.

7. The process of claim 6 wherein said core or mold is subjected to a gas containing an amine to assist the cure.

8. The process of claim 7 wherein a tin catalyst is added to the mixture.

9. A foundry core or mold composition curable to a hardened state comprising sand particles mixed with a mixture of lignin dissolved in a suitable solvent material along with an isocyanate, said lignin and isocyanate being present in an amount in the range of ¼% to 10% by weight of the sand.

10. The foundry core or mold as claimed in claim 9 wherein the weight ratio of lignin to isocyanate is on the order of 1:1 to 2:1.

11. A foundry core or mold as claimed in claim 10 which has been cured by subjecting the same to a gas containing an amine.

12. A foundry core or mold as claimed in claim 11 which contains tin which acts as a catalyst.

13. A foundry core or mold as claimed in claim 9 wherein a polyol is added to the mixture.

14. A foundry core or mold as claimed in claim 10 wherein a polyol is added to the mixture.

15. A foundry core or mold as claimed in claim 14 which has been cured by subjecting the same to a gas containing an amine.

16. A foundry core or mold as claimed in claim 15 which contains tin which acts as a catalyst.

* * * * *